United States Patent [19]

Kido

[11] Patent Number: 5,506,741
[45] Date of Patent: Apr. 9, 1996

[54] OPERATION MODE CHANGE-OVER DEVICE OF A TAPE RECORDER AND A REEL ROTATION STOPPAGE DETECTION MECHANISM THEREFOR

[75] Inventor: Kunio Kido, Tokyo, Japan

[73] Assignee: Tanashin Denki Co., Ltd., Japan

[21] Appl. No.: 514,837

[22] Filed: Aug. 14, 1995

Related U.S. Application Data

[63] Continuation of Ser. No. 277,999, Jul. 20, 1994, abandoned.

[30] Foreign Application Priority Data

Aug. 17, 1993 [JP] Japan .................................. 5-223793

[51] Int. Cl.$^6$ .................................................. G11B 15/48
[52] U.S. Cl. ....................... 360/137; 360/74.2; 360/96.3
[58] Field of Search ................................ 360/96.3, 105, 360/137, 74.1, 74.2

[56] References Cited

U.S. PATENT DOCUMENTS

| | | | |
|---|---|---|---|
| 4,210,944 | 7/1980 | Fushimi et al. | 360/74.2 |
| 4,238,808 | 12/1980 | Tomita | 360/74.2 |
| 4,485,416 | 11/1984 | Walters | 360/74.2 |

FOREIGN PATENT DOCUMENTS

| | | |
|---|---|---|
| 1-35306 | 10/1981 | Japan . |
| 59-52447 | 3/1984 | Japan ................ 360/137 |
| 4-33565 | 10/1986 | Japan . |
| 2-35646 | 2/1990 | Japan ................ 360/137 |
| 2-165452 | 6/1990 | Japan . |

*Primary Examiner*—Stuart S. Levy
*Assistant Examiner*—William J. Klimowicz
*Attorney, Agent, or Firm*—Evenson, McKeown, Edwards & Lenahan

[57] ABSTRACT

An operation mode change-over device for a tape recorder has a detection mechanism including a detection member comprised of a fine wire made of a spring material for detecting a stoppage of a reel rotation. The detection member is disposed in elastic contact at its intermediate curved portion and a tip end portion of a V-shaped outer half with the reel shaft. As the reel shaft rotates, the detection member receives rotary torque from the reel shaft to be angularly deviated, so that an end of an inner half of the detection member is engaged with a lever of the change-over device, to thereby apply an acting force to the lever. When the reel shaft stops rotating and the acting force disappears, the lever is brought into engagement with a projection of an idle gear shaft and is urged by the projection with subsequent rotation of the idle gear shaft, to thereby move a slide plate for changeover between forward and reverse modes of the tape recorder.

13 Claims, 6 Drawing Sheets

OPERATION MODE CHANGE-OVER DEVICE OF A TAPE RECORDER AND A REEL ROTATION STOPPAGE DETECTION MECHANISM THEREFOR

This application is a continuation of application Ser. No. 08/277,999 filed on Jul. 20, 1994, now abandoned.

BACKGROUND OF THE INVENTION

1. Field of the Invention

The present invention relates to an operation mode change-over device of a tape recorder and a reel rotation stoppage detection mechanism therefor.

2. Description of the Prior Art

A tape recorder comprises a mechanism section for causing a magnetic tape to run. This mechanism section includes a capstan rotatably driven by a motor, two reel receivers or keepers each mounted with a reel, and a transmission mechanism for transmitting a rotary force generated by the motor to each reel receiver, and is operable in various modes. That is, in the steady running mode, the capstan and the take-up reel rotate to cause the tape held between the capstan and a corresponding pinch roller to run at a constant speed. In the fast-forward mode or the fast-rewind mode, the take-up reel or the supply reel rotates at a higher seed to thereby wind up the tape thereon. Moreover, in the stop mode, the reel rotation is stopped to thereby cause the running tape to stop.

A typical tape recorder is provided with an automatic stop mechanism for automatically stopping the tape which runs at a constant speed, when a tape end is reached during recording or playback, or a full automatic stop mechanism for automatically stopping not only a recording or playback operation but also a fast-forward or fast-rewind operation when a tape end is detected during the operation, or an automatic reverse mechanism for changing directions of tape running when a tape end is reached for reciprocal recording and playback. Further, a tape recorder of this kind is provided with a detection mechanism for detecting a stoppage of take-up reel rotation, as a tape end detection means.

For instance, an automatic stop mechanism, disclosed in Japanese Utility Model Registration Publication No. 1-35306, accommodates therein a reel rotation stoppage detection mechanism having a detection lever which receives rotary torque from a reel shaft and which is angularly deviated in the direction in which the reel shaft rotates. The detection mechanism is so designed as to detect a stoppage of reel shaft rotation or a tape end when a deviating force acting on the detection lever disappears during the time when the reel shaft is rotatably driven. This automatic stop mechanism has a release lever which is engaged with a groove formed in the detection lever of the reel rotation stoppage detection mechanism. When the detection lever is located at its angularly deviated position, an angular motion of the release lever is restricted to thereby prevent the release lever from effecting its releasing operation. On the other hand, when the detection lever is restored from the angularly deviated position upon stoppage of the reel shaft rotation, whereby the restriction of the angular motion of the release lever is released, the release lever is rotated to a considerable extent, to thereby release a lock operation of a locking mechanism. That is, when the reel shaft rotation is stopped, a manipulation member interlocked with a manipulation button of the tape recorder is released from a locked state having been established by the locking mechanism, whereby the stop mode is automatically restored.

Another automatic stop mechanism disclosed in Japanese Utility Model Registration Publication No. 4-33565 includes an operating member which is disposed for angular motion, and which is formed with an engaged portion adapted to be engaged with and disengaged from an engaging portion formed in a gear for driving the reel receiver. When a detection member is angularly deviated, with rotation of the reel receiver, in the direction in which the reel receiver rotates, the operating member is urged by the detection member so that the engaging portion of the gear is prevented from being engaged with the engaged portion of the operating member. On the other hand, when the detection member is restored from the angularly deviated position upon stoppage of the reel receiver rotation, so that an urging force having been applied to the operating member disappears, the engaging portion is brought into engagement with the engaged portion, to thereby cause the operating member to rotate, whereby a locking operation of a locking mechanism is released, so as to permit a stop mode to be restored.

The reel rotation stoppage detection mechanism disclosed in the aforesaid U.M. Publication No. 1-35306 is designed such that the detection lever is urged toward the reel shaft by means of a spring through a friction member for transfer of torque from the reel shaft to the detection lever. In case that a friction member and a spring are used for torque transfer in this manner, the size of a tape recorder in the direction of the reel shaft increases, and the number of tape recorder components increases. This makes it difficult to make a tape recorder smaller in size, lighter in weight, and thinner in thickness.

To obviate this, in the device described in the aforesaid U.M. Publication No. 4-33565, a C-shaped detection member is provided in a manner caused to be elastically contacted from a radial direction with the outer peripheral surface of a reel receiver, so as to develop a contact pressure between the reel receiver and the detection member. However, since the detection member formed of plastic material is used for elastic contact between the detection member and the reel receiver, the detection member is required to be formed into a thickness equal to or larger than about 1 mm from the view point of mechanical strength. Therefore, the detection member cannot be installed in such a narrow space that has the size less than about 1 mm in the direction in which the reel shaft extends, so that a difficulty is encountered in making a tape recorder thinner.

In a tape recorder, especially, in a tape recorder of a type equipped with an automatic reverse mechanism, it is preferable to effect the reel rotation detection in an ensured manner irrespective of the direction in which the reel rotates. Further, it is also desirable to eliminate influences of posture or orientation of a tape recorder upon detection of reel rotation, especially in a portable tape recorder which is likely to be used with various postures. However, angular motion components of a tape recorder, such as a detection lever which constitutes a detection mechanism, are not always constructed such that opposite portions of each component with respect to its fulcrum portion for angular motion are gravitationally balanced with each other. Thus, the reel rotation detection can be performed in an unstable manner. The larger the size and weight of the angular motion components become, the greater the influences of the posture of the tape recorder upon the reel rotation detecting operation will be, so that the detecting operation becomes unstabilized depending on the posture of the tape recorder.

For example, when a tape recorder having a detection lever which extends perpendicularly to the reel shaft, is used in a vertical posture in which the reel shaft is disposed in parallel to the plane on which the tape recorder is placed, rotary torque, due to the presence of a difference between the gravity acting on the one side of the detection lever with respect to the reel shaft and that acting on another side, exerts the direction which is the same as or opposite to the direction of the angular deviation torque applied to the detection lever, depending on the direction of the reel shaft rotation, so that the angular deviation force increases or decreases accordingly. Therefore, in order to apply a sufficient angular deviation force to the detection lever for ensured reel rotation detection irrespective of the direction of reel shaft rotation, it is inevitably necessary to make the setting load of the spring larger, so that a large torque is transmitted to the detection lever. This results in drawbacks such that back tension, applied to the tape during a tape rewind operation, can be increased.

To obviate this, in the tape recorder disclosed in U.M. Publication No. 1-35306, a weight balancer which balances the gravity acting on one side of the detection lever is provided on another side of the lever, so as to make the opposite sides of the detection lever with respect to the fulcrum for angular motion balanced when the tape recorder is used in a vertical posture. As a result, a sufficient angular deviation force can be supplied to the detection lever irrespective of the direction of reel shaft rotation, even if the setting load of the spring is made smaller so that the torque transmitted from the reel shaft to the detection lever becomes small.

The device disclosed in U.M. Publication No. 4-33565 is provided at its inner periphery of the C-shaped detection member with three contact projections, and the location of the intermediately disposed contact projection is deviated toward one of the other two projections, whereby the opposite ends of the C-shaped detection member are expanded or contracted in dependence on the direction of the reel receiver rotation. As a result, when the reel receiver serves as the take-up reel, a larger rotary torque is applied to the reel receiver for ensured detection of reel rotation, whereas a smaller rotary torque is applied to the reel receiver so as to reduce back tension when the reel receiver serves as the supply reel.

Although influences of the direction of reel rotation upon reel rotation detection can be eliminated with use of the aforementioned arrangements, it becomes difficult to make a tape recorder thinner, if the detection lever mounted with a weight balancer is employed, or if the detection member which is relatively large in thickness is employed, as a tape recorder component.

SUMMARY OF THE INVENTION

An object of the present invention is to provide a reel rotation stoppage detection mechanism of a tape recorder, which is compact, lightweight, and thin.

Another object of the present invention is to provide an operation mode change-over device of a tape recorder, which is compact, lightweight, and thin.

According to one aspect of the present invention, a reel rotation stoppage detecting mechanism of a tape recorder is provided, which comprises a detection member mounted to a reel shaft of the tape recorder. The detection member is comprised of a fine wire made of a spring material, and has its one half which is bent in the middle thereof. Further, the detection member is disposed in elastic contact at its intermediate portion and at a tip end portion of the one half thereof with an outer peripheral surface of the reel shaft, whereby the detection member is angularly deviated around the reel shaft while the detection member receives rotary torque from the reel shaft.

Preferably, the detection member is comprised of a fine metal wire having a diameter less than 1 mm.

Preferably, the intermediate portion of the detection member has a curved portion which extends along the outer peripheral surface of the reel shaft. More preferably, the curved portion of the detection member is disposed in contact with a predetermined part of the outer peripheral surface of the reel shaft, and the tip end portion of the one half of the detection member is disposed to face the curved portion diametrally of the reel shaft, whereby the detection member receives a greater rotary torque from the reel shaft when the reel shaft rotates in the tape taking-up direction. The greater rotary torque is larger than rotary torque which the detection member receives when the reel shaft rotates in the tape supply direction.

Preferably, the detection member is formed such that the one half of the detection member serves as a weight balancer for another half of the detection member. More preferably, the one half of the detection member is formed into a V-shape.

Preferably, the reel rotation stoppage detection mechanism includes a movable section for effecting a predetermined motion indicative of a stoppage of reel rotation in response to restoration of the detection member from its angularly deviated position.

More preferably, the movable section includes a lever which has one end thereof adapted to be engaged with and disengaged from the detection member, and which is supported for angular motion at its intermediate portion by a support shaft movably disposed, a lever angular motion means provided in a torque transmission member through which rotary torque generated by a drive motor is transmitted to the reel shaft, and being operable to cause the lever to effect the angular motion as the torque transmission member rotates, and a lever urging means disposed for engagement with and disengagement from another end of the lever, and being operable to urge the lever with rotation of the torque transmission member when the lever urging means is engaged with another end of the lever. Whereby the lever receives an acting force of the detection member as the reel shaft generates rotary torque, so that the lever effects the angular motion while prevented from being engaged with the ever urging means. When the rotary torque of the reel shaft disappears to release engagement between the detection member and the lever and hence the acting force of the detection member onto the lever disappears, the lever is brought into engagement with the lever urging means and effects the predetermined motion indicative of a stoppage of reel rotation while the torque transmission member further rotates.

More preferably, the lever angular motion means includes an internal cam formed in the torque transmission member. The internal cam has a cam surface which is formed such that a portion of the cam surface projects inwardly from the remainder of the cam surface. The lever urging means includes a projection provided in a shaft portion of the torque transmission member.

According to another aspect of the present invention, an operation mode change-over device for a tape recorder is provided. The change-over device comprises a detection member which is comprised of a fine wire made of a spring material, and which is mounted to a reel shaft of the tape recorder in elastic contact at its intermediate portion and at a tip end portion of its one half, bent in the middle thereof, with an outer peripheral surface of the reel shaft, and operation mode change-over means for changing operation modes of the tape recorder.

The operation mode change-over means includes a coupling section coupled to an operation mode change-over mechanism section of the tape recorder, and a movable section interposed between the detection member and the coupling section. The movable section is operable to effect a predetermined motion indicative of a stoppage of reel rotation in response to restoration of the detection member from its angularly deviated position, the detection member being adapted to be angularly deviated around the reel shaft while the detection member receives rotary torque from the reel shaft.

Preferably, the movable section includes a lever which has one end thereof adapted to be engaged with and disengaged from the detection member, and which is supported for angular motion at its intermediate portion by the coupling section, a lever angular motion means provided in a torque transmission member through which rotary torque generated by a drive motor is transmitted to the reel shaft, and being operable to cause the lever to effect the angular motion as the torque transmission member rotates, and a lever urging means disposed for engagement with and disengagement from another end of the lever, and being operable to urge the lever with rotation of the torque transmission member when the lever urging means is engaged with another end of the lever. Whereby the lever receives an acting force of the detection member as the reel shaft generates rotary torque, so that the lever effects the angular motion while prevented from being engaged with the lever urging means. When the rotary torque of the reel shaft disappears to release engagement between the detection member and the lever and hence the acting force of the detection member onto the lever disappears, the lever is brought into engagement with the lever urging means and drives the operation mode change-over mechanism section through the coupling section to thereby switch operation modes of the tape recorder while the torque transmission member further rotates.

Preferably, the lever angular motion means includes an internal cam formed in the torque transmission member. The internal cam has a cam surface formed such that a portion of the cam surface projects inwardly from the remainder of the cam surface. The lever urging means includes a projection formed in a shaft portion of the torque transmission member.

Preferably, the coupling section is coupled to an operation mode selection member which is included in the operation mode change-over mechanism section and which is operable to select an operation mode of the tape recorder.

For instance, the coupling section is coupled to a forward/reverse change-over member which is included, as the operation mode selection member, in the operation mode change-over mechanism section, and which is operable to select an arbitrary one of a playback operation in a forward mode and that in a reverse mode of the tape recorder. The coupling section includes a rocking member which is rockably supported at its one end portion and which is operable to reciprocate the forward/reverse change-over member coupled to another end of the rocking member, and first and second arms which are respectively provided at opposite sides of the one end portion of the rocking member. The first arm rockably supports an intermediate portion of the lever of the operation mode change-over means.

The operation mode change-over device according to this preferred embodiment includes a second detection member which is comprised of a fine wire made of a spring material, and which is mounted to a second reel shaft of the tape recorder in elastic contact at its intermediate portion and at a tip end portion of its one half, bent in the middle thereof, with an outer peripheral surface of the second reel shaft. The operation mode change-over means further includes a second lever which has one end thereof adapted to be engaged with and disengaged from the second detection member, and which is supported for angular motion at its intermediate portion by the second arm, a second lever angular motion means provided in a second torque transmission member through which rotary torque generated by the drive motor is transmitted to the second reel shaft, and being operable to cause the second lever to effect the angular motion as the second torque transmission member rotates, and a second lever urging means disposed for engagement with and disengagement from another end of the second lever, and being operable to urge the second lever with rotation of the second torque transmission member when the second lever urging means is engaged with another end of the second lever. Whereby either one of the lever and the second lever drives the forward/reverse change-over member through the coupling section to switch from the playback operation in a corresponding one of the forward and reverse modes to the playback operation in the other of these modes when the rotary torque of a corresponding one of the reel shaft and the second reel shaft disappears.

The reel rotation stoppage detection mechanism of the present invention is advantageous in that the detection member comprised of a fine wire made of a spring material is used, to thereby make the detection member extremely compact, lightweight, and thin, while providing a sufficient mechanical strength thereto. This makes it possible to make a tape recorder compact, lightweight, and thin. In addition, it is possible to reduce influences of the posture of the tape recorder upon reel rotation detection. Accordingly, the present invention is useful especially for a potable tape recorder which must be compact, lightweight, and thin, and which is likely to be used with various postures. Moreover, the detection member of the present invention can be obtained by simply bending a fine wire, so that it has an extremely simplified structure and is hence low-priced.

The operation mode change-over device of the present invention is advantageous in that, when the rotary torque of the reel shaft disappears and hence the acting force of the detection member onto the lever disappears, so that restriction to a lever motion in terms of the acting force is released, the lever is caused to perform a motion to be brought into engagement with the lever urging means, and is then urged by the lever urging means. This makes it possible to perform the change-over of operation modes of the tape recorder even with use of the change-over device which has a relatively simplified construction. Thus, the change-over device can be made compact, lightweight, and thin. Especially, according to a preferred embodiment including the lever angular motion means constructed by an internal cam formed in a torque transmission member, and the lever urging means constructed by a projection provided in a shaft portion of the torque transmission member, the operation mode change-over device can be further made compact, lightweight, and thin.

These and other objects and advantages will become more readily apparent from an understanding of the preferred embodiment described below with reference to the following drawing figures.

BRIEF DESCRIPTION OF THE DRAWINGS

The invention will become more fully understood from the detailed description herein below with reference to the accompanying figures, given by way of illustration only and not intended to limit the present invention in which.

DETAILED DESCRIPTION

With reference to the appended drawings, a drive mechanism section of a portable cassette tape recorder of an automatic reverse type which is equipped with a reel rotation stoppage detection mechanism and an operation mode change-over device according to an embodiment of the present invention will be explained.

Figure 1:
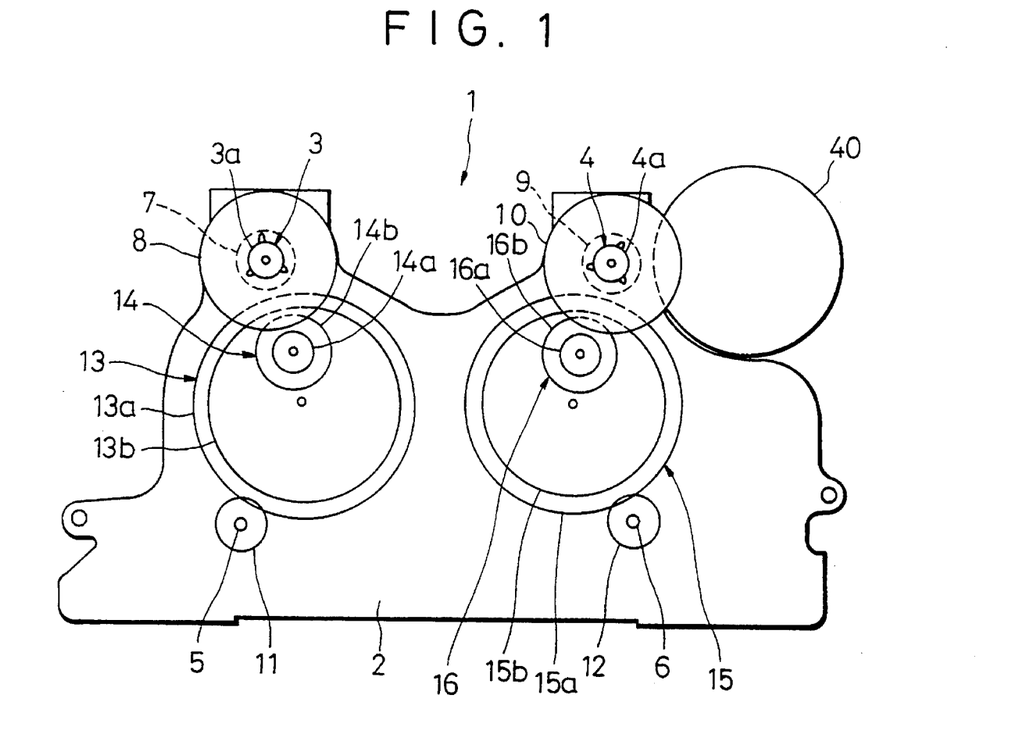
FIG. 1 is a schematic plan view showing a drive mechanism section of a tape recorder having an automatic reverse function to which a reel rotation stoppage detection mechanism according to an embodiment of the present invention is applied.

Referring to FIG. 1, the drive mechanism 1 of the tape recorder comprises a base plate 2 which extends horizontally over a length substantially equal to the entire length of a cassette tape inserted into the tape recorder. On the rear side (upper side in FIG. 1) of the base plate 2, first and second reel receivers 3 and 4 to which hubs of the cassette tape are removably fitted are disposed.

The first reel receiver 3 is rotatably supported by a rotary shaft 3a serving as a reel shaft. The rotary shaft 3a extends through the base plate 2 vertically of the tape recorder, and is rotatably supported by the base plate 2. The rotary shaft 3a has its lower end, disposed at a location below the base plate 2, to which a small-diameter gear 7 is fixed. Further, at a location above the base plate 2, a large-diameter gear 8 is mounted to the rotary shaft 3a through a friction member (not shown).

Similarly, a rotary shaft 4a of the second reel receiver 4 is mounted with a small-diameter gear 9 and a large-diameter gear 10. For the sake of simplicity of illustration, the gears 7 through 10 are shown simply by their addendum circles, with their root circles omitted.

The drive mechanism 1 further comprises first and second capstans 5 and 6 which are disposed on the front side of the base plate 2 and which are rotatably supported by the base plate 2, and a drive motor 40 fixed to the base plate 2. At locations below the base plate 2, a small-diameter gear 11, a flywheel, and a pulley (the two latter elements are not illustrated) are fixed to the first capstan 5. Similarly, the second capstan 6 is fixed with a small-diameter gear 12, a flywheel, and a pulley. Further, the drive motor has its rotary shaft fixed with a pulley (not shown), and idle pulleys (not shown) are rotatably supported by the base plate 2 through a support shaft which is common to these idle pulleys.

Moreover, rubber belts (not shown) are wound around and stretched between the pulley fixed to the motor shaft and one of the idle pulleys, and between another idle pulley and the pulleys of the capstans 5 and 6, respectively, so that a rotary force of the drive motor shaft is transmitted to the capstans 5 and 6. When the motor shaft rotates, the first capstan 5 rotate clockwise, whereas the second capstan 6 rotate counterclockwise.

Figure 2:
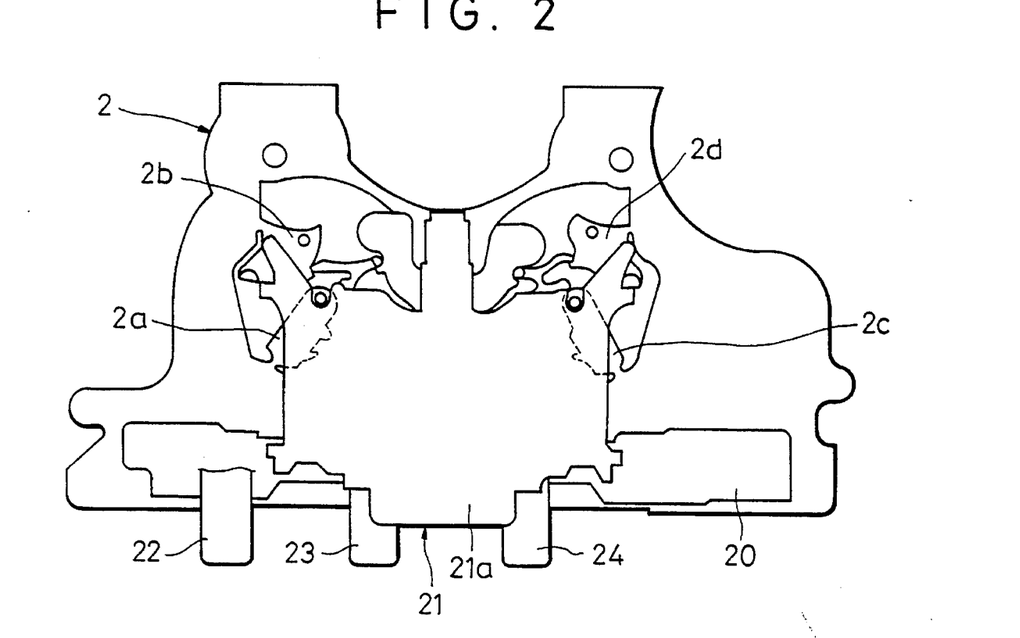
FIG. 2 is a schematic plan view showing a manipulation mechanism of the tape recorder shown in FIG. 1.

As shown in FIG. 2, a stop lever 22, a fast-feed lever 23 for reverse, and a fast-feed lever 24 for forward, respectively serving as operation mode selection members, are disposed on the front side of a lower surface of the base plate 2 for backward and forward slide motions relative to the base plate 2. These levers 22 through 24 are adapted to be mounted with manipulation buttons (not shown).

Moreover, a slide plate for change-over between forward and reverse modes (hereinafter, simply referred to as slide plate) 20 is provided. The slide plate 20 has a main body 20a thereof disposed on the front side of an upper surface of the base plate 2 for leftward and rightward motions relative to the base plate 2. The slide plate body 20a is coupled to a mode change-over lever 20f (FIG. 9) which serves as another operation mode selection member, and which is adapted to be mounted with a manipulation button, not shown. Further, the slide plate body 20a is provided at its upper central part with a head plate 21 for backward and forward slide motions relative to the base plate 2. The head plate 21 is integrally formed with a playback lever serving as still another operation mode selection member, and is formed at a central part of its front edge with a projection 21a which is adapted to be mounted with a manipulation button (not shown) for the playback lever. Moreover, a magnetic head, not shown, is mounted on a vertical wall, not shown, which is formed integrally with the head plate 21 and which extends vertically from a front edge of the head plate 21.

Referring to FIG. 1 again, at locations below the base plate 2, a large-diameter cam gear 13 and a gear 14 are disposed as idle gears (more generally, torque transmission members) between the gears 7 and 8 of the first reel receiver 3 and the gear 11 of the first capstan 5. The cam gear 13 is comprised of a ring gear having an outer gear 13a and an inner gear 13b, and the outer gear 13a is always in mesh with the gear of the capstan 5. The gear 14 is comprised of a small-diameter upper gear 14a and a large-diameter lower gear 14b. The gears 13 and 14 have their shafts rotatably supported by journal sections 2a and 2b (FIG. 2), respectively, which sections are angularly movable relatively to the base plate 2, so that the gears 13 and 14 are also movable relatively to the base plate 2.

Similarly, a cam gear 15 which is comprised of an outer gear 15a and an inner gear 15b, and a gear 16 which is comprised of a small-diameter upper gear 16a and a large-diameter lower gear 16b are interposed between the gears 9 and 10 of the second reel receiver 4 and the gear 12 of the second capstan 6. The gears 15 and 16 have their shafts supported by Journal sections 2c and 2d which are disposed for angular motion relative to the base plate 2, so that these gears 15 and 16 are movable relatively to the base plate 2.

Figure 9:
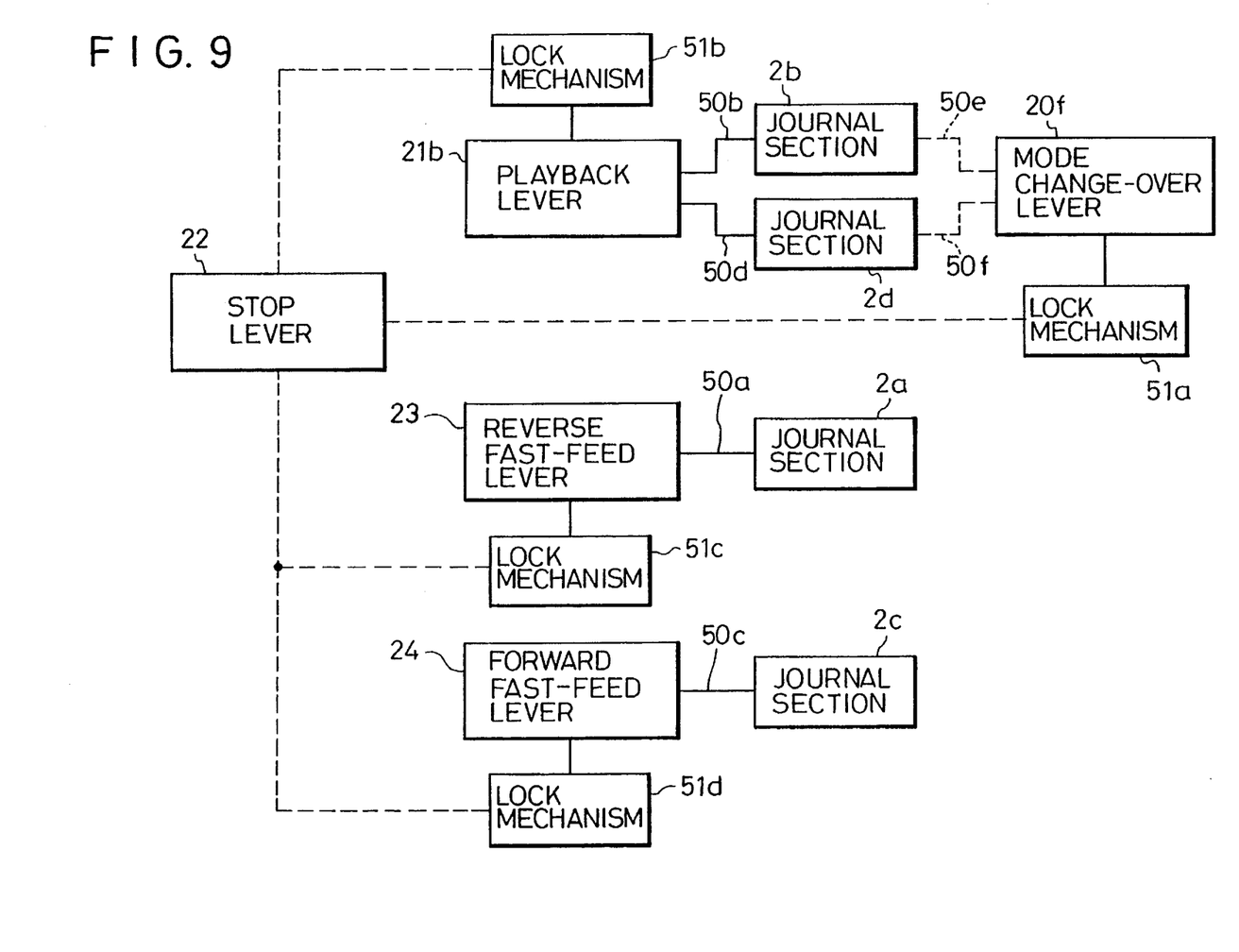
FIG. 9 is a pictorial view showing an operation mode change-over mechanism section of the tape recorder, which includes journal sections supporting various gears of the drive mechanism shown in FIG. 1, manipulation levers of the manipulation mechanism shown in FIG. 2, and manipulation force transmission mechanisms interposed between the journal sections and the manipulation levers.

In an operation mode change-over mechanism section, pictorially shown in FIG. 9, of the tape recorder, the journal sections 2a to 2d are associated with the reverse fast-feed lever 23, the playback lever 21b, the forward fast-feed lever 24, and the playback lever 21b through manipulation force transmission mechanisms 50a to 50d, respectively, such that a manipulation force applied by a user to a certain one of these levers is transmitted to a corresponding one of the journal sections 2a to 2d through a corresponding one of the manipulation force transmission mechanisms 50a to 50d each of which is comprised of a lever or a spring (none of which is illustrated) or a combination of these elements, for instance. Moreover, the journal sections 2b and 2d are respectively associated with the mode change-over lever 20f through the manipulation force transmission mechanisms 50e and 50f which include the slide plate body 20a, when the playback lever 21b is locked in its operative position.

In FIG. 9, reference numeral 51a through 51d denote lock mechanisms for locking the levers 20f, 21b, 23, and 24 in their operative positions, respectively. Each lock mechanism is comprised of, e.g., a projection (not shown) provided in one of a corresponding one of the levers and a corresponding one of the manipulation force transmission mechanisms, and a groove or notch (not shown) formed in the other of the lever and the mechanism and cooperating with the projection to lock the associated lever when the groove or notch is engaged with the projection. The thus locked lever by means of the associated lock mechanism is released when the stop lever 22 is manipulated. Although illustration of operational relationships between the levers 21b, 23 and 24 and the lock mechanisms 51a to 51d are omitted in FIG. 9, the locked lever is also released when any one of the levers other than the locked lever is manipulated.

Thus, each of the journal sections 2a to 2d is rotated upon manipulation of the associated lever and upon lever manipulation for releasing the lock of the associated lever. With rotation of the journal section, an engaged state of the associated gear is changed. That is, the associated gear 13, 14, 15 or 16 is brought into or out of engagement with the corresponding one of the gears 7, 8 on the first reel receiver 3 side and the gears 9, 10 on the second reel receiver 4 side.

More specifically, when none of the playback lever 21b, the reverse fast-feed lever 23 and the forward fast-feed lever 24 is manually operated, so that these levers are in their inoperative positions, the journal sections 2a to 2d and the gears 13 to 16 are held at positions away from the reel receivers 3 and 4, respectively. Thus, the gears 7 and 8 of the reel shaft 3a are out of engagement with the gears 13 and 14, and the gears 9 and 10 of the reel shaft 4a are out of engagement with the gears 15 and 16.

When the playback lever 21b is depressingly manipulated, the journal sections 2b, 2d and the gears 14, 16 are respectively depressed and moved toward the reel receivers 3,4 through the manipulation force transmission mechanisms 50b, 50d. If the mode change-over lever 20f is in its neutral position, then the gears 14a, 14b are in mesh with the gear 8 of the reel receiver 3 and the inner gear 13b, respectively, and the gear 16a, 16b are in mesh with the gear 10 of the reel receiver 4 and the inner gear 15b, respectively.

Under the aforementioned engaged state, if the mode change-over lever 20f is switched from the neutral position to the later-mentioned reverse position, then the journal section 2d and the gear 16 are moved through the manipulation force transmission mechanism 50f in the direction away from the second receiver 4, to thereby release the engagement between the gear 16a and the gear 10 and the engagement between the gear 16b and the inner gear 15b, with the engagement between the gear 14a and the gear 8 and the engagement between the gear 14b and the inner gear 13b kept maintained. Contrary to this, if the mode changeover lever 20f is switched to the later-mentioned forward position, then the journal section 2b and the gear 14 are moved through the manipulation force transmission mechanism 50e in the direction away from the first reel receiver 3 to thereby release the engagement between the gears 14a, 8 and between the gear 14b and the inner gear 14b, with the engagement between the gears 16a, 10 and between the gear 16b and the inner gear 15b kept maintained.

If the reverse fast-feed lever 23 is depressingly manipulated, then the journal section 2a and the gear 18 are depressed and moved through the manipulation force transmission mechanism 50a toward the first reel receiver 3, so that the outer gear 13a is brought into engagement with the gear 7. If the forward fast-feed lever 24 is depressed, moreover, then the journal section 2c and the gear 15 are depressed and moved through the manipulation force transmission mechanism 50c toward the second reel receiver 4, to cause the outer gear 15a to be brought in engagement with the gear 9.

In the following, an automatic reverse mechanism (more generally, operation mode change-over device) of the tape recorder constructed as mentioned above will be explained.

Figure 3:
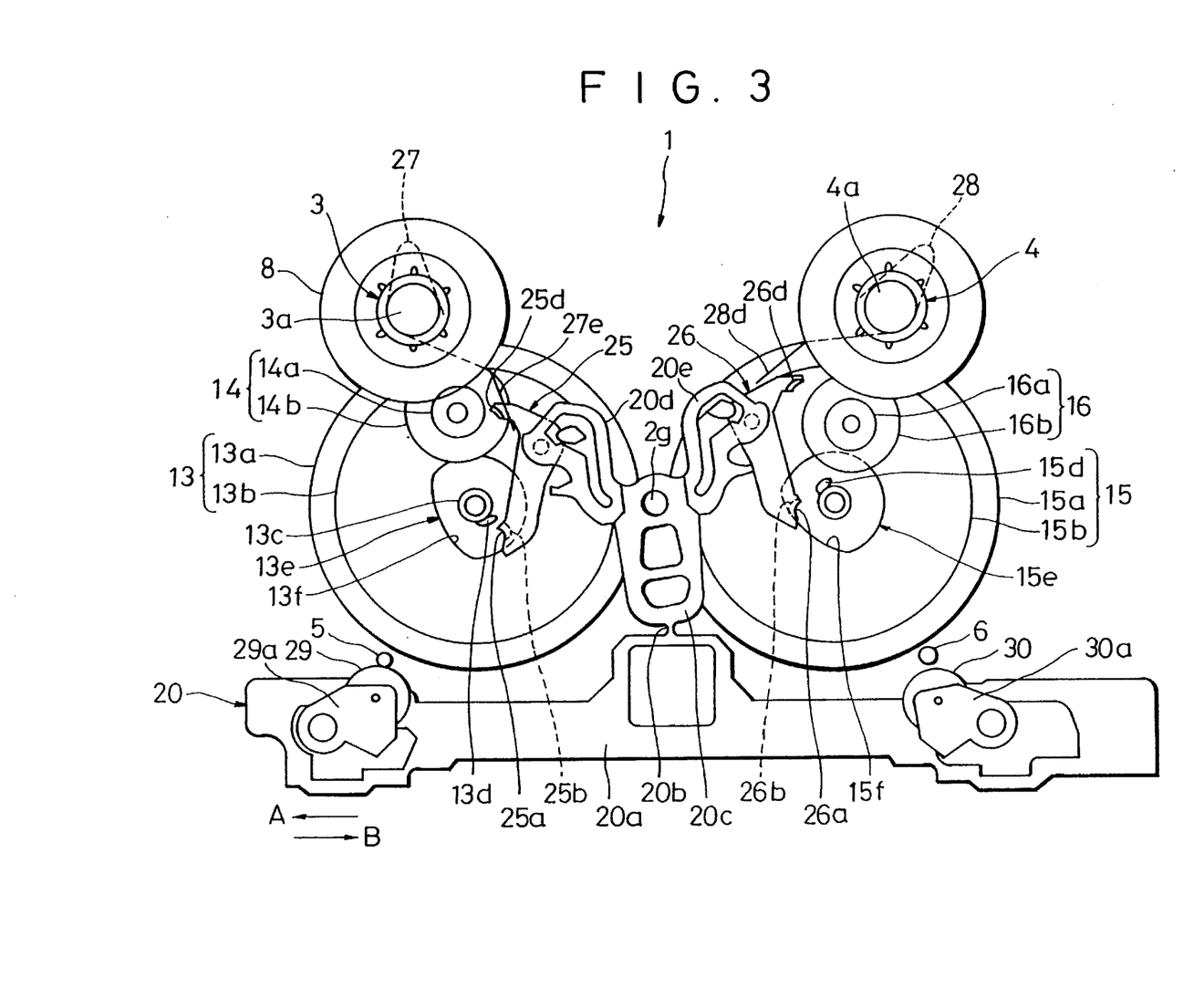
FIG. 3 is a schematic plan view showing the automatic reverse mechanism and the reel rotation stoppage detection mechanism of the tape recorder shown in FIG. 1.

The automatic reverse mechanism includes the aforementioned slide plate 20, which is adapted to be switched between forward and reverse positions manually through the medium of the mode change-over lever 20f, or automatically by means of the automatic reverse mechanism. That is, as shown in FIG. 3, the slide plate body 20a is moved leftward to establish the forward mode, whereas, it is moved rightward to establish the reverse mode. Meanwhile, the slide plate body 20a is in its neutral position, when the stop lever 22 is operated, or when the reverse fast-feed lever 23 or the forward fast-feed lever 24 is locked in its operative position.

A rocking member 20c is rockably connected to a central part of the slide plate body 20a through a connecting section 20b. The rocking member 20c is supported at its rear end by a support shaft 2g projecting from the base plate 2, and is adapted to be rotated around the support shaft 2g when the slide plate body 20a moves. That is, the rocking member 20c rotates counterclockwise when the slide plate body 20a moves rightward (i.e., in the direction of the arrow B) as viewed in FIG. 3, whereas it rotates clockwise when the plate body 20a moves leftward (in the direction of the arrow A). Conversely, the slide plate body 20a moves rightward when the rocking member 20c rotates counterclockwise, whereas it moves leftward when the rocking member 20c rotates clockwise.

The automatic reverse mechanism further includes first and second arm sections 20d and 20e respectively connected to the left and right sides of the rear end portion of the rocking member 20c, and first and second levers 25 and 26. Each of these levers is formed into substantially an L-shape, and is supported at its intermediate portion by a corresponding one of support shafts, provided at tip ends of the arm sections 20d and 20e, for rocking motion relative to the arm 20d or 20e. The arms 20d and 20e cooperate with the rocking member 20c to form a coupling section through which the levers 25 and 26 are coupled to the slide plate 20.

Figure 6:
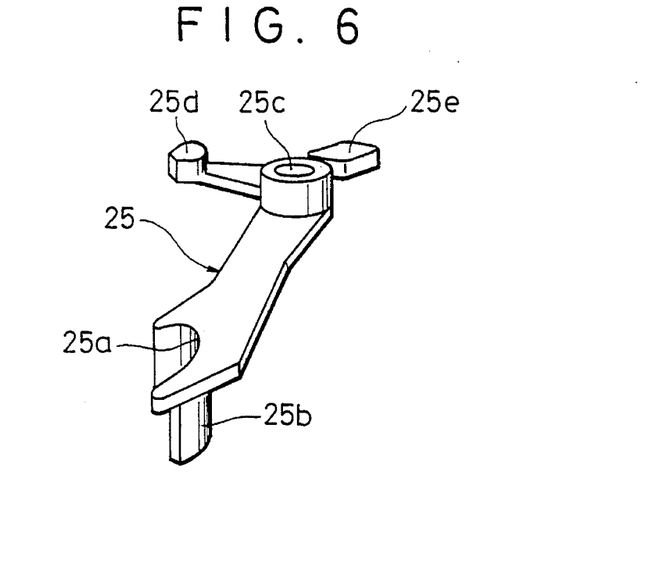
FIG. 6 is a perspective view of the lever of the automatic reverse mechanism shown in FIG. 4.

As shown in FIG. 6, the first lever 25 has a notch 25a formed at a tip end of one side thereof, and a projection 25b formed at the lower surface of the same tip end. Further, the first lever 25 is provided at the upper surface of a tip end of the other side thereof with a projection 25d. The lever 25, which is formed into an L-shape as mentioned above, has a bent portion formed with a shaft hole 25c, and a projection 25e formed in the vicinity of the bent portion and adapted to be brought into contact at its lower surface with the upper surface of the base plate 2 so as to prevent a vertical motion of the lever 25 when the lever 25 is rotated as the below-mentioned automatic reverse operation is performed. The projection 25e also serves as a weight balancer for the lever 25 adapted to effect angular motion around a support shaft formed as a fulcrum in the arm 20d and fitted in the shaft hole 25c. The lever 25 is angularly movable together with the arm 20d which cooperates with the lever 25, etc. to constitute an operation mode change-over means.

The cam gear 13 is provided with a hub (shaft portion) 13c which has a projection 13d serving as first lever urging means. The projection 13d is formed at a predetermined location of the outer peripheral surface of the hub 13c, and is adapted to be engaged with and disengaged from the notch 25a of the lever 25. When the projection 13d is in engagement with the notch 25a, the lever 25 receives a rotary force of the hub 13c of the cam gear 13, to be rotated around the support shaft 2g together with the arm 20d.

Figure 5:
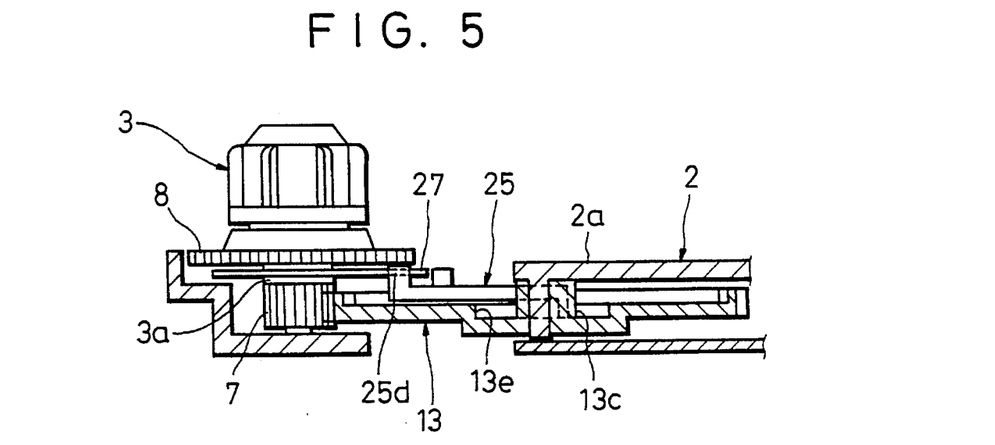
FIG. 5 is a fragmentary enlarged view showing essential part of the mechanisms shown in FIG. 4.

The automatic reverse mechanism further includes first lever angular motion means for causing the first lever 25 to effect an angular motion. The lever angular motion means has an internal cam 13e formed in the cam gear 13. As shown in FIG. 5, the internal cam 13e is concavely formed around the hub 13c, and has its inner peripheral surface which serves as a cam face. Most portions of the cam face of the internal cam 13e extend concentrically of the hub 13c, and the remainder portion of the cam face projects toward the hub 13c. Further, the lever 25 is disposed such that the projection 25b formed at the lower surface of the lever 25 is in and out of contact with the cam face of the cam 13e, whereby the lever 25 is angularly moved in a manner following the rotation of the cam 13e when the projection 25b is in contact with the cam face.

Figure 4:
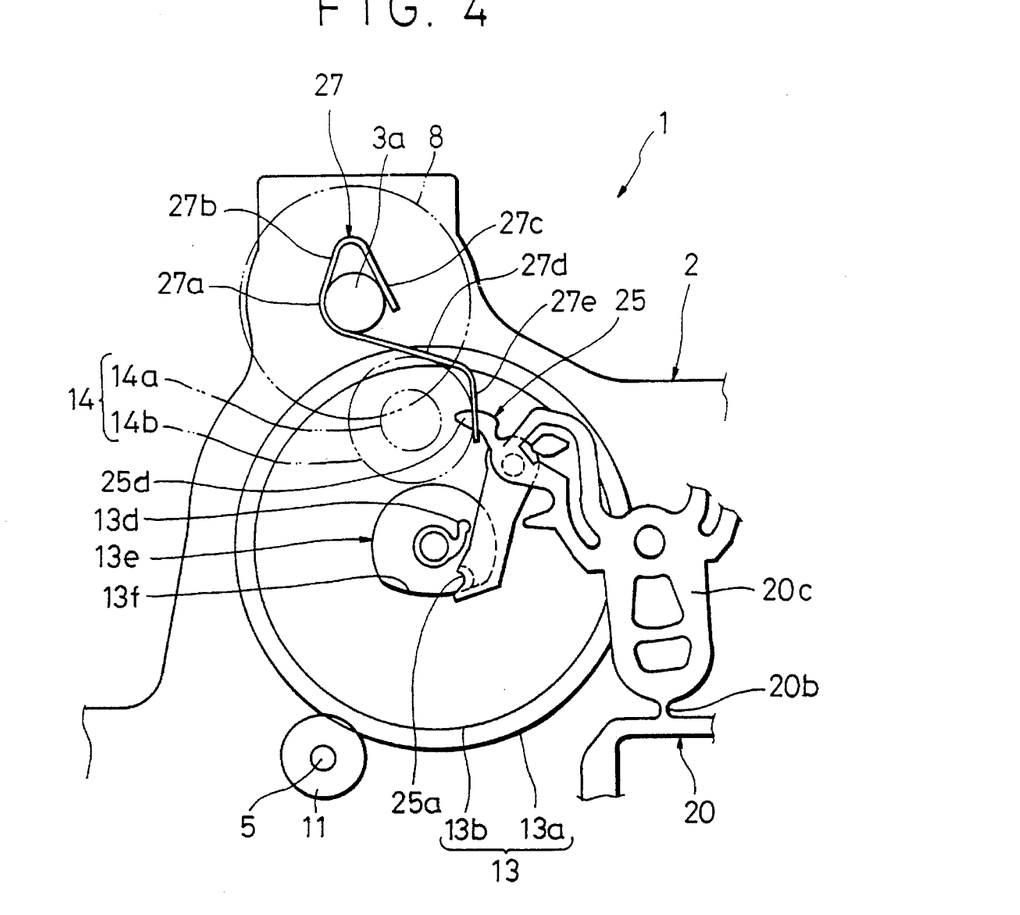
FIG. 4 is a fragmentary enlarged view showing essential part of the mechanisms shown in FIG. 3.

The automatic reverse mechanism includes a first reel rotation detection mechanism for detecting the rotation of the first reel receiver 3. This detection mechanism includes a reel rotation detection member 27 which is interposed between the rotary shaft 3a of the first reel receiver 3 and the projection 25d of the first lever 25, as shown in FIG. 4.

The detection member 27 is comprised of a fine wire made of a spring material, preferably, of a fine metal wire having a diameter less than 1 mm (for instance, a fine wire made of spring steel and having a diameter of 0.3 mm). The detection member 27 is provided at its intermediate portion with a curved portion 27a which extends along the outer peripheral surface of the rotary shaft 3a over approximately one quarter of the circumference of the rotary shaft 3a. Further, the detection member 27 has its outer half 27b with respect to the curved portion 27a, the outer half 27b being inwardly bent in the middle thereof and being formed into a V-shape. A tip end portion 27c of the V-shaped outer half 27b is disposed to face the curved portion 27a diametrally of the rotary shaft 3a. Moreover, an inner half 27d of the detection member 27 with respect to the curved portion 27a is outwardly bent in the middle thereof as shown by reference numeral 27e, and is, as a whole, formed into substantially an L-shape. The detection member 27 is permitted to be engaged at the tip portion 27e of the inner half 27d with the projection 25d of the lever 25. Meanwhile, it is not inevitably necessary to form the inner half 27d into an L-shape. The outer half 27b, bent into a V-shape, of the detection member 27 serves as a weight balancer for the inner half 27d which extends for engagement with the projection 25b of the lever 25. In this manner, the detection member 27 is formed such that the gravity acting on the outer half 27b balances the gravity acting on the inner half 27d with respect to the curved portion 27a.

The detection member 27 for reel rotation detection is disposed in elastic contact with the outer peripheral surface of the rotary shaft 3a of the reel receiver 3 at the curved portion 27e and the tip end portion 27c of the outer half 27b, whereby rotary torque of the rotary shaft 3a is permitted to be transmitted to the detection member 27. More specifically, the curved portion 27a of the detection member 27 is in contact with a predetermined part, i.e., the quadrant round, on the left and slightly lower side as viewed in FIG. 3, of the outer peripheral surface of the rotary shaft 3a, and the tip end portion 27c is in contact with the right and slightly upper side of the outer periphery of the rotary shaft 3a. Thus, when the rotary shaft 3a rotates in the tape taking-up direction (clockwise in FIG. 3), contact friction produced between the outer periphery of the rotary shaft 3a and the tip end portion 27c exerts in a cutting-into direction, so that the detection member 27 receives a great angular deviation force. On the contrary, when the rotary shaft 3a rotates in the tape supply direction (counterclockwise in FIG. 3), the contact friction between the outer periphery of the rotary shaft 3a and the tip end portion 27c exerts in a relief direction, so that the angular deviation force is weakened. As a consequence, the detection member 27 receives a great rotary torque from the rotary shaft 3a only when the rotary shaft 3a rotates in the tape taking-up direction.

The second lever 26 of the automatic reverse mechanism is constructed symmetrically with the first lever 25 with respect to an imaginary line which, in FIG. 3, passes through the support shaft 2g and which extends perpendicularly to the axis of the slide plate body 20a. The second lever 26 is disposed for rocking motion together with the arm 20e.

The automatic reverse mechanism is further provided with second lever angular motion means, including an internal cam 15e, for causing the second lever 26 to effect an angular motion, and a second reel rotation detection mechanism, including an detection member 28, for detecting rotation of the second reel receiver 4. The second lever angular motion means and the second reel rotation detection mechanism are constructed symmetrically with the first ever angular motion means and the first reel rotation detection mechanism with respect to the aforementioned imaginary line, so that structural explanations of these elements are omitted herein.

In the following, operations of the tape recorder which includes the automatic reverse mechanism constructed in the above manner will be explained.

When the playback lever 21b, the reverse fast-feed lever 23, and the forward fast-feed lever 24 are in their inoperative positions, the journal sections 2a to 2d and the gears 13 to 16 supported by these journal sections are held away from the reel receivers 3 and 4. As a result, the gears 7 and 8 of the reel shaft 3a are not in mesh with the gears 13 and 14, and the gears 9 and 10 of the reel shaft 4a are not in mesh with the gears 13 and 14. Thus, the rotary force generated by the motor is not transmitted to the reel shafts 3a and 4a, so that the reel receivers 3 and 4 do not rotate. Further, the pinch rollers 29 and 30 are held away from the capstans 5 and 6, so that the magnetic tape (not shown) of the cassette, which loosely passes between the capstans 5, 6 and the pinch rollers 29, 30, is not delivered even if the capstans 5, 6 rotate.

Now assuming that the playback lever 21b is manipulated under such a condition (reverse mode) that the slide plate 20 is moved to the right as shown by the arrow B in FIG. 3, the head plate 21 is depressed as shown in FIG. 2. With this movement of the head plate 21, the journal section 2b is urged toward the first reel receiver 3 through the medium of the manipulation force transmission mechanism 50b (FIG. 9) interposed between the playback lever 21b (plate 21) and the journal section 2b, so that the journal section 2b and the shaft of the gear 14 supported by this journal section are moved toward the first reel receiver 3. As a result, the lower gear 14b is brought in mesh with the inner gear 13b of the cam gear 13, and the upper gear 14a is brought in mesh with the upper gear 8 of the reel receiver 3. Then, the playback lever 21b is locked in its operative position by means of the lock mechanism 51b, to thereby maintain the aforementioned meshing state.

At the same time, pinch roller support members 29a and 30a (FIG. 3), which are respectively abutted against free ends of two springs (not shown) each having a proximate end fixed to the aforementioned vertical wall formed integrally with the head plate 21, are urged toward the rear side of the tape recorder, so that the pinch rollers 29 and 30 are positioned near the capstans 5 and 6, respectively. In the reverse mode, the pinch roller 29 is brought into urged contact with the capstan 5, whereby the tape is held therebetween.

Moreover, the rotary shaft of the drive motor rotates, and hence the capstan 5 is rotated clockwise by the rotational force of the motor shaft, to cause the tape to move to the left in FIG. 3. The rotational force of the capstan 5 is transmitted, through the gear 11 of the capstan 5, the cam gear 13, and the gears 14 and 8, to the rotary shaft 3a of the reel receiver 3. As a result, the reel receiver 3 rotates clockwise to wind the tape, with a predetermined tension, on a reel mounted on the reel receiver 3. At this time, the cam gear 13 rotates counterclockwise.

The reel rotation detection member 27 is angularly deviated clockwise around the reel shaft 3a as the reel receiver 3 rotates, so that the tip end portion 27e of the detection member 27 is brought into contact with the projection 25d of the lever 25, to thereby apply a rotary force to the lever 25, which force exerts in the counterclockwise direction. As a result, the projection 25b of the lever 25 is in contact with the cam 13e of the cam gear 13 with a slight contact force (FIG. 4). On the other hand, the cam gear 13 continues to rotate, with the central projection 13d prevented from interfering with the distal end of the lever 25. Thus, the lever 25 is angularly moved in a manner following the rotation of the cam 13e as the cam 13e rotates. Whereupon, a playback operation of the tape recorder in the reverse mode is performed, so that sound signals recorded in the tape are played back.

Further, the capstan 6 (FIG. 3) of the second reel receiver 4 is rotated by the drive motor in the counterclockwise direction, and hence the cam gear 15 rotates clockwise. In the reverse mode, however, the engagement between the gear 16 and the cam gear 15 and between the gear 16 and the gear 10 of the reel receiver 4 is released, by means of action of the manipulation force transmission mechanism 50f (FIG. 9) associated with the mode change-over lever 20f (slide plate 21), and therefore, the second reel receiver 4 is rendered free. On the other hand, the tape is delivered with rotation of the capstan 5 on the first reel receiver 3 side, and is then wound on the reel mounted on the first reel receiver 3 which rotates clockwise. Thus, a rotational force acting on the first reel receiver 3 acts on the second reel receiver 4 through the tape, so that the second reel receiver 4 rotates in the clockwise direction.

With this clockwise rotation of the reel receiver 4, the reel rotation detection member 28 on the side of the second reel receiver 4 rotates clockwise, and thus the distal end 28d of the detection member 28 is moved away from the projection 26d of the second lever 26. In the reverse mode wherein the rocking member 20c is angularly deviated in the counterclockwise direction, a force generated by a malfunction prevention spring (not shown) mounted to the lever 26 is rendered effective and acts on the lever 26, so that the lever 26 is angularly deviated in the clockwise direction. As a consequence, the ever 26 is angularly moved in a manner following the rotation of the cam 15e as the cam gear 15 rotates. In the meantime, the force produced by the malfunction prevention spring is rendered ineffective so as not to be applied to the lever 26, if the forward mode is established as a result of a rocking motion of the rocking member 20c to the clockwise direction.

Thereafter, when the tape end is reached during the playback in the reverse mode, the second reel receiver 4 stops rotating, and the resultant tension produced in the tape causes the rotation of the rotary shaft 3a of the first reel receiver 3 to stop. As a result, the rotational torque of the rotary shaft 3a disappears, and hence the rotary torque transmitted from the rotary shaft 3a to the reel rotation detection member 27 disappears. Thus, an urging force having been applied from the detection member 27 to the lever 25 in the counterclockwise direction disappears, so that the detection member 27 is permitted to move in the direction away from the projection 25d of the first lever 25. Therefore, the detection member 27 can be positioned at an appropriate angular position determined in dependence on gravitational balance between the opposite halves 27b and 27d of the detection member 27 with respect to the fulcrum of rocking motion of the detection member 27. Meanwhile, the gear 8 of the reel receiver 3 continues to rotate with a friction force produced between itself and the rotary shaft 3a.

Figure 7:
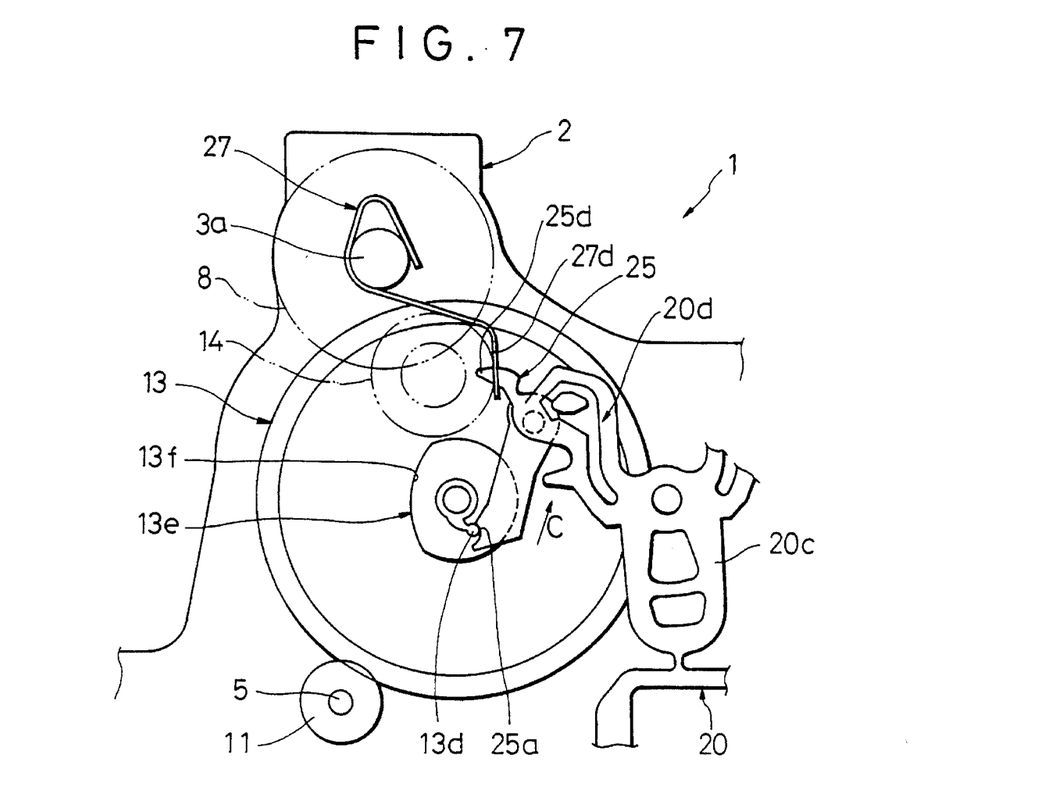
FIG. 7 is a fragmentary enlarged view showing operations of the reel rotation stoppage detection mechanism and the automatic reverse mechanism shown in FIG. 4 in a reverse mode.

After extinction of the urging force having been applied from the detection member 27 to the lever 25, when the projecting portion 13f of the internal cam 13e of the cam gear 13 is brought into contact with the projection 25b of the lever 25 as the cam gear 13 rotates, the lever 25 is caused to move by the projecting portion 13f toward the hub 13c, and is held at that position. Next, when the projection 13d of the cam gear 13 is brought into engagement with the notch 25a of the lever 25, as shown in FIG. 7, due to further rotation of the cam gear 13, the cam gear 13 continues to rotate while causing the lever 25 and the arm 20d of the slide plate 20 which is movable in unison with the lever 25 to move upward in the direction of the arrow C.

Figure 8:
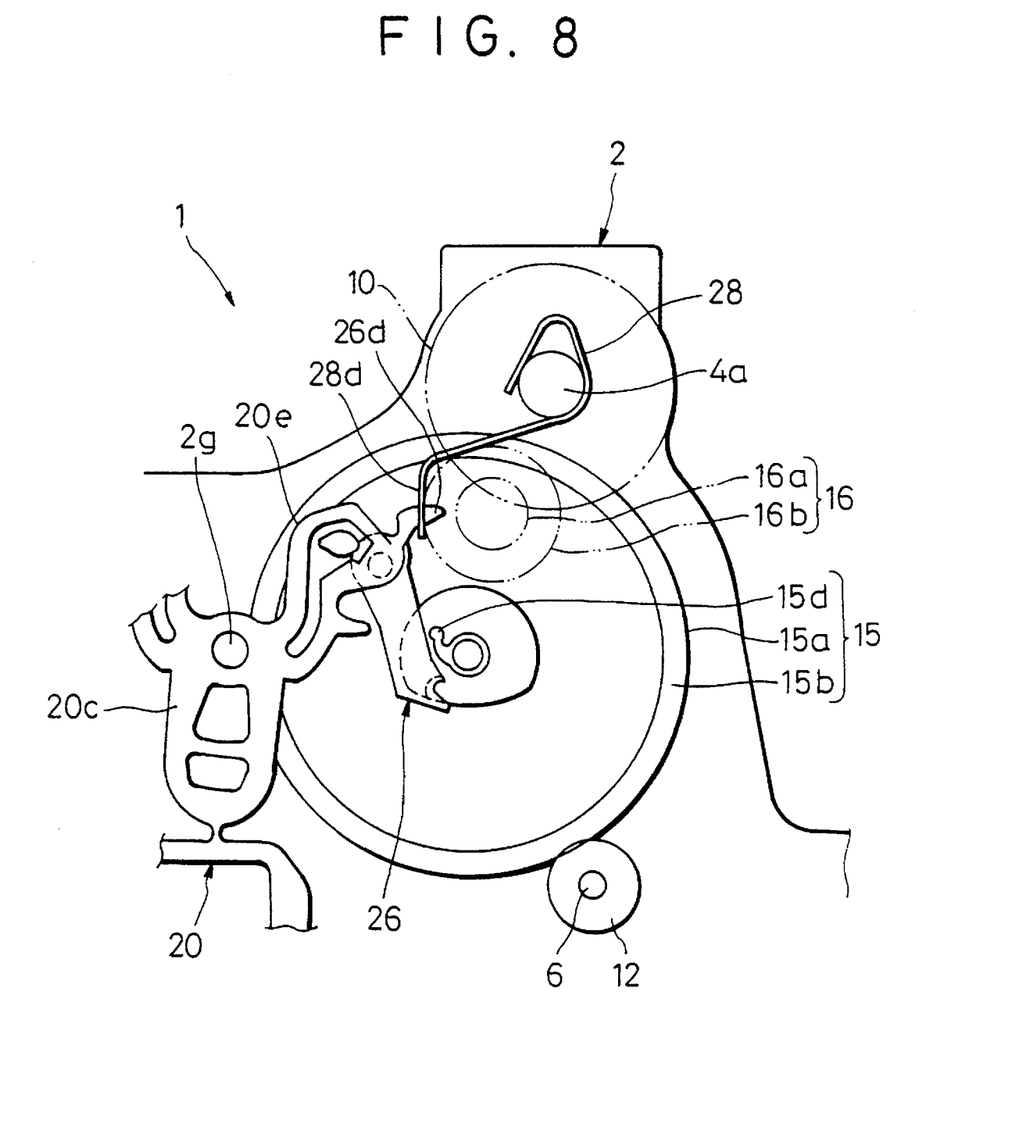
FIG. 8 is a fragmentary enlarged view showing a state where the reverse mode is switched to a forward mode.

This upward movement of the arm 20d causes the rocking member 20c of the slide plate 20 to rotate clockwise around the shaft 2g, as shown in FIG. 8. As a result, the slide plate body 20a moves leftward as shown by the arrow A in FIG. 3, so that the slide plate 20 is changed over from the reverse position to the forward position. Upon change-over to the forward mode, the pinch roller 29 moves in the direction away from the first capstan 5. At the same time, due to action of the manipulation force transmission mechanism 50e which responds to the movement of the slide plate 20, the movement being equivalent to the operation of the mode change-over lever 20f, the gear 14 is moved away from the first reel receiver 3, whereby the engagement between the gear 14a and the gear 8 of the reel receiver 3 and between the gear 14b and the inner gear 13b is released, to thereby make the rotary shaft 3a free. Moreover, with the movement of the slide plate 20, the rotary shaft of the gear 16 is moved toward the second reel receiver 4, so that the lower gear 16b is brought in mesh with the inner gear 15b of the cam gear 15. Also, the upper gear 16a is brought in mesh with the gear 10 of the reel receiver 4, and the pinch roller 30 is brought in urged contact with the second capstan 6. The capstan 6 rotates clockwise, and the second reel receiver 4 is rotated counterclockwise. Thus, the tape is delivered by the capstan 6 and the pinch roller 30 to the right in FIG. 3, and is then wound on the reel mounted on the second reel receiver 4. In this manner, the playback operation in the forward mode is started.

During the playback in the forward mode, the reel rotation detection member 28 is rotated counterclockwise as the rotary shaft 4a of the reel receiver 4 rotates counterclockwise. The distal end portion 28d of the detection member 28 is in contact with the projection 26d of the lever 26, to thereby apply a rotary force, exerting in the clockwise direction, to the lever 26, whereby the lever 26 is angularly swung in a manner following the cam 15e of the cam gear 15, with the engagement between the lever 26 and the projection 15d kept prevented.

Thereafter, when a tape end is reached during the playback in the forward mode, the slide plate 20 is changed over to the reverse side in the same manner as in the aforesaid case. Switching between the reverse mode and the forward mode is automatically achieved in this way.

Moreover, in the arrangement shown in FIGS. 1 through 3, when the reverse fast-feed lever 23 is manipulated, the journal section 2a is urged toward the reel receiver 3, so that the cam gear 13 is moved toward the reel receiver 3. As a result, the outer gear 18a is, on one hand, kept in mesh with the gear 11 of the capstan 5, and is, on the other hand, brought in mesh with the gear 7 of the reel receiver 3. Whereupon, the reel receiver 3 rotates clockwise at a higher speed, to fast-rewind the tape on the reel associated therewith. Further, when the forward fast-feed lever 24 is manipulated, the journal section 2c is urged toward the reel receiver 4 to cause the cam gear 15 to move toward the reel receiver 4, so that the outer gear 15a of the cam gear 15 kept in mesh with the gear 12 of the capstan 6 is brought in mesh with the gear 9 of the reel receiver 4. Thus, the reel receiver 4 rotates counterclockwise at a higher speed for a fast-forward movement of the tape.

The present invention is not limited to the foregoing embodiment, and may be modified in various manners.

For instance, in the foregoing embodiment, the case has been described wherein the present invention is applied to the tape recorder of a type equipped with the automatic reverse mechanism, as an operation mode change-over device, for detecting a tape end by means of the reel rotation detection member 27 or 28, and for driving the slide plate 20 as an operation mode selection member, to thereby automatically effecting the change-over of the slide plate 20 between its forward and reverse positions. However, the present invention is also applicable to a tape recorder which is equipped with an operation mode change-over device, other than the automatic reverse mechanism, such as an automatic stop mechanism for automatically stop the tape delivery with the aid of a function of a slide plate which is moved in response to detection of a tape end. In other words, a tape recorder to which the present invention is applied is not necessarily provided with an automatic reverse mechanism. Thus, the present invention can be applied to a tape recorder which has a forward mode function alone.

From the above-described embodiment of the present invention, it is apparent that the present invention may be modified as would occur to one of ordinary skill in the art without departing from the spirit and scope of the present invention which should be defined solely by the appended claims. All such modifications as would be obvious to one of ordinary skill in the art should not be regarded as a departure from the spirit and scope of the invention, and should be included within the scope of the invention as defined solely by the appended claims.

What is claimed is:

1. A reel rotation stoppage detection mechanism of a tape recorder, comprising:

a detection member mounted to a reel shaft of the tape recorder, said detection member consisting of a fine wire made of a spring material and extending in a direction-substantially perpendicular to a longitudinal axis of the reel shaft so as to space a free tip end portion from the reel shaft, and having one half which is bent in a middle thereof, said detection member being disposed in elastic contact at an intermediate portion thereof and at the free tip end portion of said one half with an outer peripheral surface of the reel shaft, whereby said detection member is angularly deviated around the reel shaft while said detection member receives rotary torque from the reel shaft and a movable section for effecting a predetermined motion indicative of a stoppage of reel rotation in response to restoration of said detection member from its angularly deviated position, wherein the free tip end portion is movable away from the movable section when the detection member does not receive the rotary torque from the reel shaft, and elastic contact between the intermediate portion and the free tip end portion and the outer peripheral surface of the reel shaft results from the spring material of the detection member.

2. The reel rotation stoppage detection mechanism according to claim 1, wherein said detection member is comprised of a fine metal wire having a diameter less than 1 mm.

3. The reel rotation stoppage detection mechanism according to claim 1, wherein said intermediate portion of said detection member has a curved portion which extends along the outer peripheral surface of the reel shaft.

4. The reel rotation stoppage detection mechanism according to claim 3, wherein said curved portion of said detection member is disposed in contact with a predetermined part of the outer peripheral surface of the reel shaft, and said free tip end portion of said one half of said detection member is disposed to face said curved portion diametrically of the reel shaft, whereby said detection member receives a greater rotary torque from the reel shaft when the reel shaft rotates in a tape taking-up direction, the greater rotary torque being larger than rotary torque which said detection member receives when the reel shaft rotates in a tape supply direction.

5. The reel rotation stoppage detection mechanism according to claim 1, wherein said detection member is formed such that said one half of said detection member serves as a weight balancer for another half of said detection member.

6. The reel rotation stoppage detection mechanism according to claim 5, wherein said one half of said detection member is formed into a V-shape.

7. A reel rotation stoppage detection mechanism of a tape recorder, comprising:

a detection member mounted to a reel shaft of the tape recorder, said detection member being comprised of a fine wire made of a spring material, and having one half which is bent in a middle thereof, said detection member being disposed in elastic contact at an intermediate portion thereof and at tip end portion of said one half with an outer peripheral surface of the reel shaft, whereby said detection member is angularly deviated around the reel shaft while said detection member receives rotary torque from the reel shaft, a movable section for effecting predetermined motion indicative of a stoppage of reel rotation in response to restoration of said detection member from its angularly deviated position, wherein said movable section includes:

a lever having one end thereof adapted to be engaged with and disengaged from said detection member, and supported for angular motion at its intermediate portion by a support shaft movably disposed;

a lever angular motion means provided in a torque transmission member through which rotary torque generated by a drive motor is transmitted to the reel shaft, said lever angular motion means being operable to cause said lever to effect the angular motion as said torque transmission member rotates; and a lever urging means disposed for engagement with and disengagement from another end of said lever, said lever urging means being operable to urge said lever with rotation of said torque transmission member when said lever urging means is engaged with another end of said lever, whereby said lever receives an acting force of said detection member as the reel shaft generates rotary torque, so that said lever effects the angular motion while prevented from being engaged with said lever urging means, and whereby, when the rotary torque of the reel shaft disappears to release engagement between said detection member and said lever and hence the acting force of said detection member onto said lever disappears, said lever is brought into engagement with said lever urging means and effects the predetermined motion indicative of a stoppage of reel rotation while said torque transmission member further rotates.

8. The reel rotation stoppage detection mechanism according to claim 7, wherein said lever angular motion means includes an internal cam formed in said torque transmission member, the internal cam having a cam surface which is formed such that a portion of said cam surface projects inwardly from a remainder of said cam surface, and wherein said lever urging means includes a projection provided in a shaft portion of said torque transmission member.

9. An operation mode change-over device for a tape recorder, comprising:

a detection member operatively associated with a reel shaft, consisting of a fine wire made of a spring material and extending in a direction substantially perpendicular to a longitudinal axis of the reel shaft so as to space a free tip end portion from the reel shaft, and mounted to said reel shaft of the tape recorder in elastic contact at an intermediate portion thereof and the free tip end portion of its one half, bent in a middle thereof, with an outer peripheral surface of the reel shaft; and operation mode change-over means for changing operation modes of the tape recorder, said operation mode change-over means including:

a coupling section coupled to an operation mode change-over mechanism section of the tape recorder; and a movable section interposed between said detection member and said coupling section, said movable section being operable to effect a predetermined motion indicative of a stoppage of reel rotation in response to restoration of said detection member from an angularly deviated position, said detection member being adapted to be angularly deviated around the reel shaft while said detection member receives rotary torque from the reel shaft wherein the free tip end portion is movable away from the movable section when the detection member does not receive the rotary torque from the reel shaft, and elastic contact between the intermediate portion the free tip end portion and the outer peripheral surface of the reel shaft results from the spring material of the detection member.

10. An operation mode change-over device for a tape recorder, comprising:

a detection member comprised of a fine wire made of a spring material, and mounted to a reel shaft of the tape recorder in elastic contact at an intermediate portion thereof and at a tip end portion of its one half, bent in a middle thereof, with an outer peripheral surface of the reel shaft; and operation mode change-over means for changing operation modes of the tape recorder, said operation mode change-over means including:

a coupling section coupled to an operation mode change-over mechanism section of the tape recorder; and a movable section interposed between said detection member and said coupling section, said movable section being operable to effect a predetermined motion indicative of a stoppage of reel rotation in response to restoration of said detection member from an angularly deviated position, said detection member being adapted to be angularly deviated around the reel shaft while said detection member receives rotary torque from the reel shaft, wherein said movable section includes:

a lever having one end thereof adapted to be engaged with and disengaged from said detection member, and supported for angular motion at an intermediate portion by said coupling section;

a lever angular motion means provided in a torque transmission member through which rotary torque generated by a drive motor is transmitted to the reel shaft, said lever angular motion means being operable to cause said lever to effect the angular motion as said torque transmission member rotates; and a lever urging means disposed for engagement with and disengagement from another end of said lever, said lever urging means being operable to urge said lever with rotation of said torque transmission member when said lever urging means is engaged with another end of said lever, whereby said lever receives an acting force of said detection member as the reel shaft generates rotary torque, so that said lever effects the angular motion while prevented from being engaged with said lever urging means, and whereby, when the rotary torque of the reel shaft disappears to release engagement between said detection member and said lever and hence the acting force of said detection member onto said lever disappears, said lever is brought into engagement with said lever urging means and drives said operation mode change-over mechanism section through said coupling section, to thereby switch operation modes of the tape recorder while said torque transmission member further rotates.

11. The operation change-over device according to claim 10, wherein said lever angular motion means includes an internal cam formed in said torque transmission member, said internal cam having a cam surface formed such that a portion of said cam surface projects inwardly from a remainder of said cam surface, and wherein said lever urging means includes a projection formed in a shaft portion of said torque transmission member.

12. The operation mode change-over device according to claim 10, wherein said coupling section is coupled to an operation mode selection member which is included in said operation mode change-over mechanism section and which is operable to select an operation mode of the tape recorder.

13. The operation mode change-over device according to claim 12, further including:

a second detection member which is comprised of a fine wire made of a spring material, and which is mounted to a second reel shaft of the tape recorder in elastic contact at an intermediate portion thereof and at a tip end portion of its one half, bent in the middle thereof, with an outer peripheral surface of the second reel shaft;

wherein said coupling section is coupled to a forward/reverse change-over member which is included, as said operation mode selection member, in said operation mode change-over mechanism section, and which is operable to select an arbitrary one of a playback operation in a forward mode and that in a reverse mode of the tape recorder;

wherein said coupling section includes a rocking member which is rockably supported at its one end portion and which is operable to reciprocate said forward/reverse change-over member coupled to another end of said rocking member, and first and second arms which are respectively provided at opposite sides of said one end portion of said rocking member, said first arm rockably supporting an intermediate portion of said lever of said operation mode change-over means; and wherein said operation mode change-over device includes:

a second lever having one end thereof adapted to be engaged with and disengaged from said second detection member, and supported for angular motion at an intermediate portion by said second arm;

a second lever angular motion means provided in a second torque transmission member through which rotary torque generated by the drive motor is transmitted to the second reel shaft, said second lever angular motion means being operable to cause said second lever to effect the angular motion as said second torque transmission member rotates; and a second lever urging means disposed for engagement with and disengagement from another end of said second lever, said second lever urging means being operable to urge said second lever with rotation of said second torque transmission member when said second lever urging means is engaged with another end of said second lever, whereby either one of said lever and said second lever drives said forward/reverse change-over member through said coupling section to switch from the playback operation in a corresponding one of the forward and reverse modes to the playback operation in the other of these modes when the rotary torque of a corresponding one of said reel shaft and said second reel shaft disappears.

* * * * *